United States Patent [19]
Morris

[11] 3,885,122
[45] May 20, 1975

[54] WELDING APPARATUS

[75] Inventor: James C. Morris, Elyria, Ohio
[73] Assignee: TRW Inc., Cleveland, Ohio
[22] Filed: Aug. 28, 1973
[21] Appl. No.: 392,204

[52] U.S. Cl. ................................................. 219/98
[51] Int. Cl. ........................................... B23k 9/20
[58] Field of Search ................ 219/97, 98, 99, 100

[56] References Cited
UNITED STATES PATENTS

| | | | |
|---|---|---|---|
| 3,073,947 | 1/1963 | Mortensen et al. | 219/98 |
| 3,242,307 | 3/1966 | Mowry et al. | 219/98 X |
| 3,414,699 | 12/1968 | Neumeier et al. | 219/98 X |
| 3,546,418 | 12/1970 | Graham | 219/98 X |
| 3,723,698 | 3/1973 | Logan et al. | 219/98 |

*Primary Examiner*—J. V. Truhe
*Assistant Examiner*—Clifford C. Shaw
*Attorney, Agent, or Firm*—Allen D. Gutchess, Jr.

[57] ABSTRACT

Welding apparatus for welding studs by a drop technique is provided. In this type of welding, a stud is held a predetermined distance above a workpiece with an electrical potential maintained therebetween. The stud is held in a chuck which in turn is associated with a plunger or ram. The stud, the chuck, and plunger are allowed to drop the predetermined distance to the workpiece at which time the stud becomes fused thereto. Weights can be applied to the plunger and the height of the stud above the workpiece can be varied to achieve a proper weld for a particular stud and a particular workpiece. The chuck, when in the initial welding position above the workpiece, is frequently too close to the workpiece to enable a new stud to be loaded easily, if at all. In accordance with the invention, means, and specifically a fluid-operated cylinder, is provided to raise the chuck and plunger to a position above the initial weld position to facilitate loading of a new stud. After loading, the plunger, chuck, and stud are lowered to the initial weld position at which time the weld can be effected in the usual manner.

18 Claims, 6 Drawing Figures

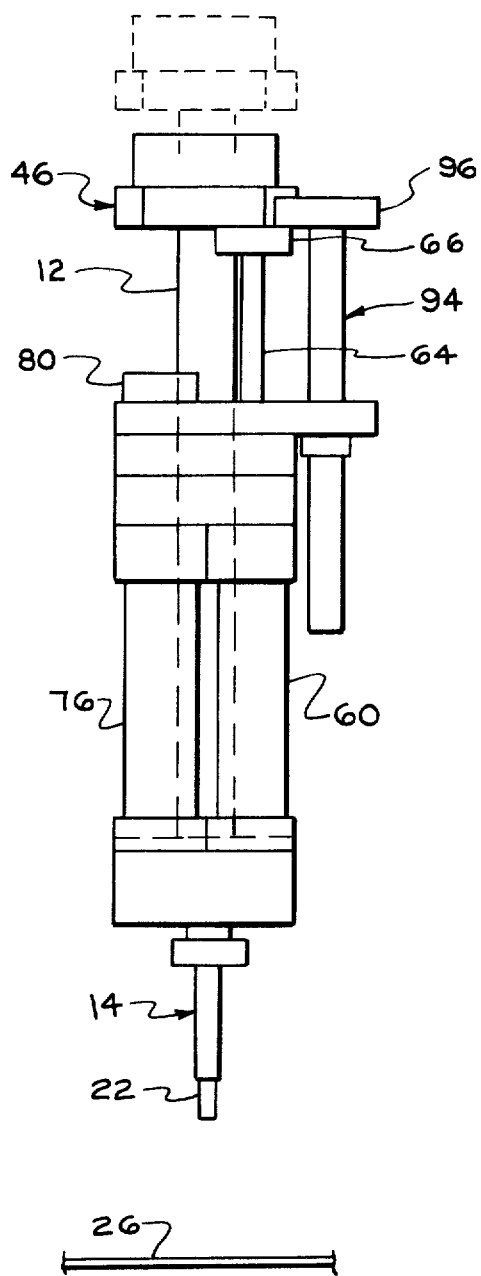
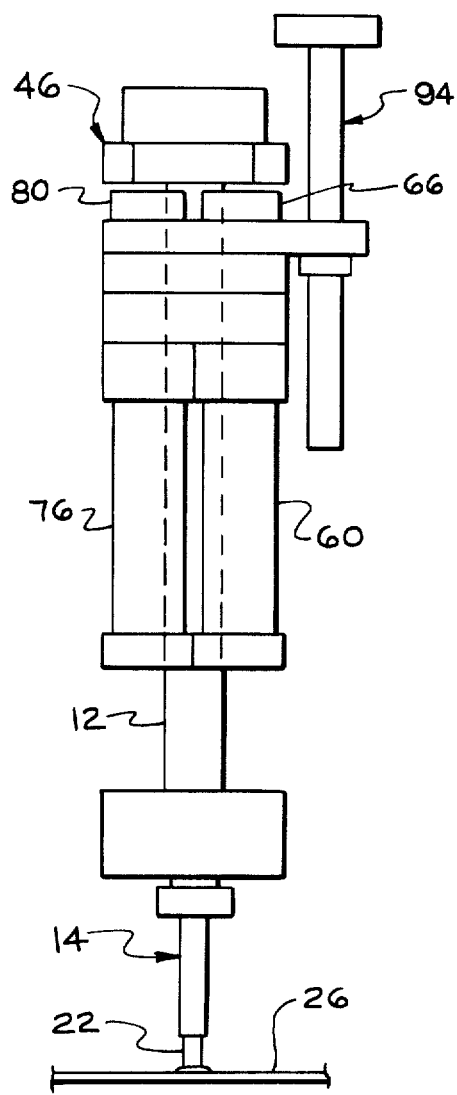
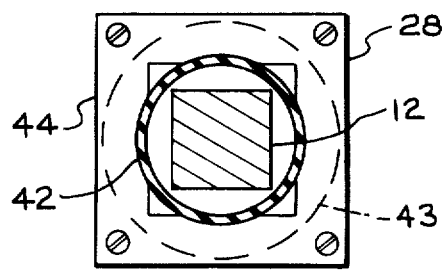

WELDING APPARATUS

This invention relates to welding apparatus and particularly to welding apparatus using a drop technique.

Welding apparatus with which the instant invention is concerned employs a plunger or ram mounted for vertical movement and carrying a chuck or stud holder at its lower end. A stud is held in the chuck with an end protruding therefrom and is positioned a predetermined distance above a workpiece. The stud commonly has a small tip of predetermined size thereon which flashes to initiate a welding arc. An electrical potential is established between the stud and the workpiece, and the plunger is then released, allowing the plunger, chuck, and stud to fall toward the workpiece, with the stud being welded thereto as it comes in contact therewith. The initial welding position of the stud above the workpiece can be changed and weights can be added to the plunger to establish a given speed and force with which the stud contacts the workpiece. Generally, a larger dropping distance and heavier weights are employed for larger diameter studs having larger weld bases, with the size of the tip also having a bearing on the distance and weight. A fluid-operated cylinder is commonly used with the plunger to move it back up to the initial weld position after a stud has been welded.

With welding apparatus of this type, it has heretofore been difficult to load a new stud in the chuck when the plunger and chuck are moved back to the initial weld position because of the relatively short distance between the chuck and the workpiece. The resulting slow down in the loading operation also has tended to slow down the overall welding operation. Attempts to overcome this problem have been less than satisfactory for one reason or another.

In accordance with the invention, means are provided to move the plunger and chuck to an upper position above the initial weld position, after a stud has been welded. In the upper position, the chuck is spaced sufficiently above the workpiece to enable an operator to readily load a new stud into the end of the chuck. The moving means are preferably in the form of a second fluid-operated cylinder located in parallel with the first fluid-operated cylinder which has heretofore been used to move the plunger and the chuck up to the initial weld position. The second fluid-operated cylinder moves the plunger and chuck from the lower position in which a stud has just been welded to the upper position above the initial weld position. When the second fluid-operated cylinder is then actuated in a manner to retract the piston, the plunger can fall freely, the piston rod of the second cylinder being retracted far enough to be out of the way of the plunger even when in its lower position. The free fall, however, is interrupted by the piston rod of the first fluid-operated cylinder which is in the path of the plunger at a location to place the plunger and the chuck in the initial weld position.

After the first piston rod has stopped the plunger in the initial weld position, the first rod is retracted to be out of the way of the plunger even in its lower position. The plunger can then fall freely until the stud carried by the chuck contacts the workpiece and is welded thereto. The second cylinder can then be operated to cause its piston rod to move the plunger back to the upper loading position in which the chuck can be readily loaded. At this time, the piston rod of the first cylinder is moved back to the initial weld position. The initial weld position of the first piston rod is determined by an adjustable stop which is located in the path of the first piston rod to engage the first piston rod as it moves upwardly, but is clear of the path of the plunger. The stop can have a threaded arrangement for adjustment which enables the initial weld position to be closely and accurately controlled.

It is, therefore, a principal object of the invention to provide improved drop welding apparatus.

Another object of the invention is to provide drop welding apparatus having means for more easily loading studs in a chuck thereof.

A further object of the invention is to provide drop welding apparatus including means for moving a chuck and plunger to an upper position and means for holding the chuck and plunger at an initial weld position below the upper position.

Still another object of the invention is to provide welding apparatus for welding studs by the drop technique employing one fluid-operated cylinder to move the plunger from a lower, welded position to an upper, loading position and a second fluid-operated cylinder for holding the plunger at an intermediate, initial weld position.

Many other objects and advantages of the invention will be apparent from the following detailed description of a preferred embodiment thereof, reference being made to the accompanying drawings, in which:

FIG. 3 is a top view of the apparatus of FIG. 2;

FIG. 4 is a view in transverse section taken along the line 4—4 of FIG. 2;

FIG. 5 is a schematic view of the apparatus of FIG. 1, shown in a different position; and FIG. 6 is a view similar to FIG. 5 but with the apparatus in still a third position.

Figure 1:
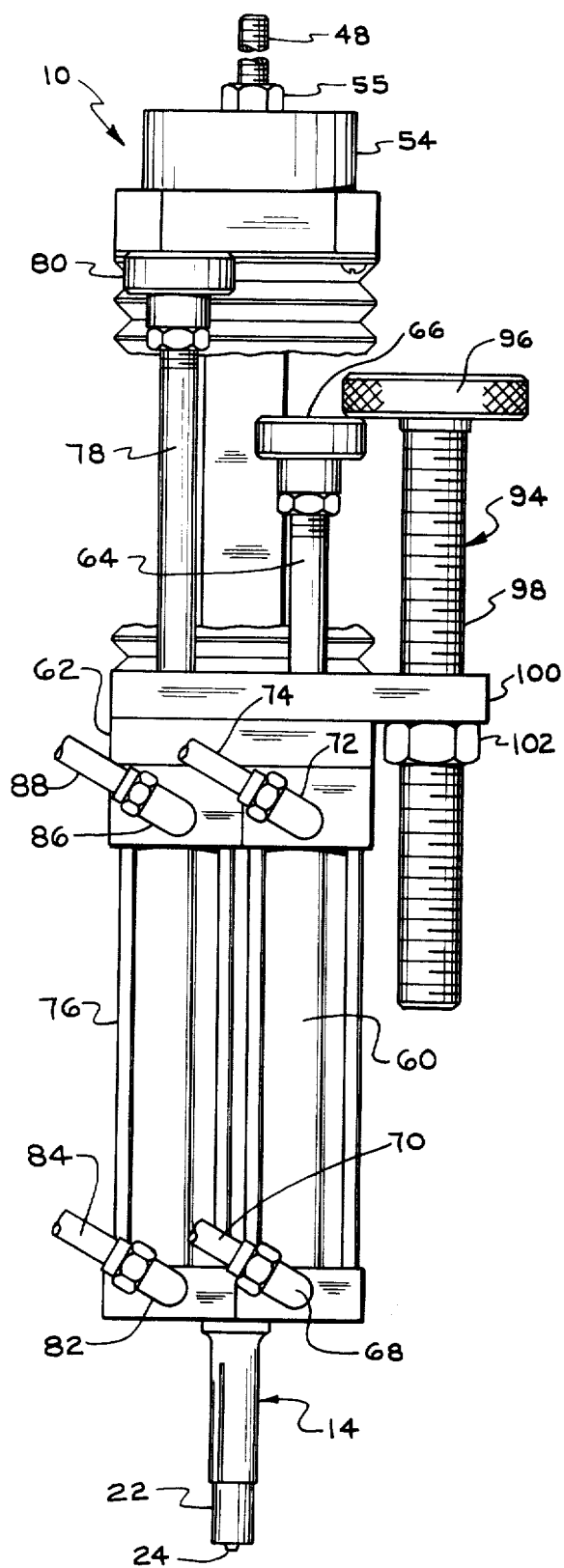
FIG. 1 is a side view in elevation of welding apparatus embodying the invention, with parts broken away.
Figure 2:
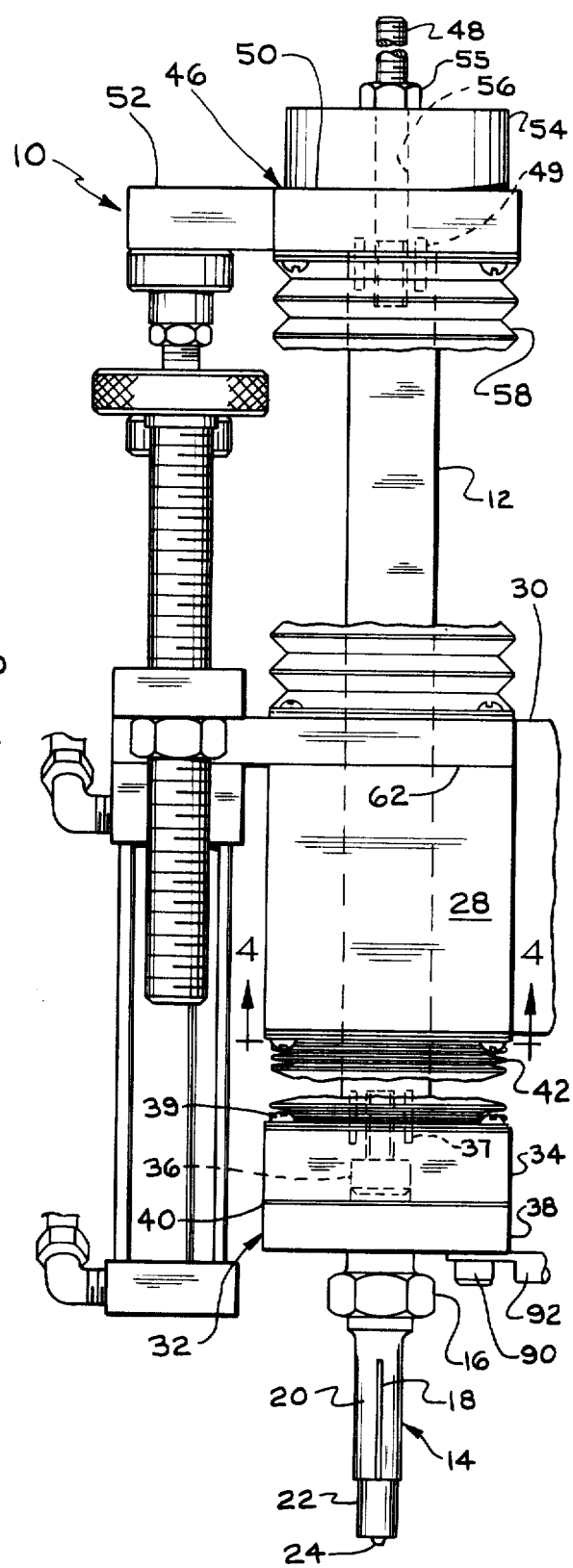
FIG. 2 is a front view in elevation of the apparatus of FIG. 1, with parts broken away.

Referring to the drawings, and particularly to FIGS. 1 and 2, apparatus for welding studs by a drop technique is indicated at 10. The apparatus includes a plunger or ram 12 having a square transverse cross section, as shown in FIG. 4, with a stud chuck 14 connected to the lower end by a nut 16 which enables the chuck to be easily replaced. The chuck 14 has slots 18 therein forming bifurcated fingers 20 which frictionally engage a stud 22. The stud 22 is of a known design, having a tip 24 of predetermined size and shape to vaporize when the stud 22 is brought into contact with a workpiece 26 (FIGS. 5 and 6) to initiate a welding arc between the stud and the workpiece. The plunger 12 is guided in a bearing member or block 28 which has a bracket 30 extending therefrom with the bracket being affixed to a suitable support or stand (not shown) to hold the bearing block 28 in a predetermined position.

A chuck adapter 32 actually is interposed between the lower end of the plunger 12 and the chuck nut 16. The chuck adapter is made in two parts, an upper part 34 affixed to the lower end of the plunger by a cap screw 36 and roll pins 37, and a lower part 38 affixed to the upper part by fasteners 39. The upper part 34 is made of an insulating material and the cap screw 36 is further insulated by an insulating sheet 40. A lower bellows 42 is located between the bearing block 28 and the chuck adapter 32, having flanges 43 connected to both by retaining plates 44 (FIG. 4).

A stop plate 46 is affixed to the upper end of the plunger 12 by a threaded rod 48 and roll pins 49. The plate 46 includes a main platform 50 and an extension 52. Weights 54 of predetermined thickness and diameter can be located on the platform 50, the weights having bores 56 centrally therein to receive the shank of the threaded rod 48, with the weights held down by a nut 55. All of the weights 54 which are used are preferably of the same diameter with the same diameter bore, with only the thickness changed to vary the weight thereof. In a typical instance, the weights can vary from ¼ inch to 4 inches, in quarter-inch increments, with the weights ranging from 1 pound to 16 pounds, in 1-pound increments.

An upper bellows 58 is located between the bearing block 28 and the stop plate 46 and can be mounted similarly to the lower bellows 42. The bellows are employed to keep the plunger 12 dirt free and to prevent dirt from being carried into the bearing block 28. The plunger 12 must be guided in the bearing block 28 with a minimum of friction to enable a free fall of the plunger 12 and the chuck 14. Any dirt in the bearing would affect this fall and would produce variable, unpredictable results.

A first, fluid-operated cylinder 60 is carried by the bearing block 28 through a bracket 62 and has a piston rod 64 extending upwardly therefrom. A head 66 is suitably mounted on the upper end of the piston rod 64. Fluid is supplied to and exhausted from the lower end of the cylinder 60 through a fitting 68 and a line 70 and fluid is supplied to and exhausted from the upper end by a fitting 72 and a line 74. The cylinder 60 supports the plunger and the chuck in an initial weld position from which the plunger, chuck, and stud are dropped to weld the stud to the workpiece.

A second, fluid-operated cylinder 76 is also carried by the bracket 62 and has a piston rod 78 extending upwardly therefrom. A head 80 is affixed to the upper end of the piston rod 78. Fluid is supplied to and exhausted from the lower end of the second cylinder 76 by a fitting 82 and a line 84. Similarly, fluid is supplied to and exhausted from the upper end of the cylinder 76 by a fitting 86 and a line 88. The second cylinder 76 is employed to move the plunger and chuck from the lower position in which the stud carried by the chuck is welded to the workpiece to an upper, loading position in which the chuck 14 is sufficiently above the initial weld position to enable another stud to be end loaded therein quickly and easily, without interference.

An electrical potential must be established between the stud 22 and the workpiece 26 to effect the weld. For this purpose, the lower part 38 of the chuck adapter 32 has a terminal screw 90 to which a welding cable 92 is connected. The cable is connected to a suitable power source and controls, which in turn are also connected to the workpiece 26, in a manner known in the art.

The initial weld position of the piston rod 64 is determined by adjusting means in the form of an adjusting screw 94 having a stop head 96 and a threaded shank 98. The shank 98 extends through an arm 100 located on top of the bracket 62 and has a jam nut 102 to hold the threaded shank 98 in a predetermined position. The stop head 96 is located in the path of the piston rod head 66 but is clear of the path of the extension 52 of the stop plate 46.

In the operation of the apparatus 10, when fluid is supplied to the lower fittings 68 and 82 of the cylinders 60 and 76, the piston rod 64 is moved upwardly against the stop head 98 and the piston rod 78 is moved to the upper, loading position. The head 80 of the piston rod 78 engages the extension 52 of the stop plate 46 to cause the stop plate and the plunger 12 to move upwardly as the piston rod 78 moves upwardly.

After the next stud 22 is loaded in the end of the chuck 14 so as to be frictionally engaged by the bifurcated fingers 20, the fluid is then exhausted through the lower fitting 82 and supplied to the upper fitting 86 for the cylinder 76. This quickly retracts the piston rod 78 to a position below the lower position of the stop plate 46 when the plunger 12 and the chuck 14 are in their lower positions. When the piston rod 78 retracts, the stud 22, the chuck 14, the plunger 12, and the stop plate 46 move downwardly under the force of gravity until the extension 52 contacts the head 66 of the piston rod 64. The piston rod 64 in the meantime had moved upwardly until it contacted the stop head 96 of the adjustable stop 94. When the extension 52 contacts the piston rod head 66, the plunger 12 and the chuck 14 are in the initial weld position.

The piston rod 64 preferably holds the stop plate 46 only momentarily (FIG. 5) until the parts have come to equilibrium after dropping from the upper, loading position. Fluid is then supplied to the fitting 72 and exhausted from the lower fitting 68 of the cylinder 60 to cause the piston rod 64 to quickly retract therein and drop the head 66 to a lower position in which it is below the lower position of the stop plate 46 when the plunger 12 and the chuck 14 are in their lower positions. At this time, when the piston rod 64 retracts, the stop plate 46, the plunger 12, the chuck 14, and the stud 22 fall freely under the force of gravity until the stud contacts the workpiece and is welded thereto (FIG. 6).

Fluid is then supplied to the lower fittings 68 and 82 of both of the cylinders 60 and 76 to cause the piston rod 64 to move against the stop head 96 and to cause the piston rod 78 to move the stop plate 46 to the upper position in which the plunger 12 and the chuck 14 are in the loading position above the initial weld position. The welded stud is automatically stripped from the chuck 14 at this time. After the next stud is loaded into the chuck 14, the sequence can begin again.

The fluid supplied to the cylinders 60 and 76 can be accomplished through suitable four-way valves which can be automatically or manually operated in a manner well known in the art.

Various modifications of the above-described embodiment of the invention will be aparent to those skilled in the art, and it is to be understood that such modifications can be made without departing from the scope of the invention, if they are within the spirit and the tenor of the accompanying claims.

I claim:

1. Stud welding apparatus comprising a plunger member mounted for movement among an upper position, an intermediate position, and a lower position; chuck means attached to said plunger member for movement therewith and for holding a weldable stud with one end thereof extending out of the chuck means; first means including first support means mounted for longitudinal movement with respect to said plunger member, for holding said plunger member at said intermediate position and for enabling said plunger member and said chuck means to drop to said lower position to enable the one end of said stud to strike a workpiece; second means including second support means mounted for longitudinal movement with respect to said plunger member, for moving said plunger member and said chuck means from said lower position in a straight line to said upper position above the workpiece, for holding said plunger member and said chuck means in said upper position, and for enabling said plunger member and said chuck means to move downwardly in a straight line from said upper position to said intermediate position; and means for producing an electrical potential between the stud and the workpiece to cause the stud to be fused to the workpiece when they come in contact.

2. Stud welding apparatus according to claim 1 characterized by means for changing said intermediate position of said plunger member as determined by said first support means.

3. Stud welding apparatus according to claim 2 characterized by said changing means comprises an adjustable stop interposed in the path of said first support means and clear of the path of said plunger member.

4. Stud welding apparatus according to claim 3 characterized by a threaded rod connected to said stop for changing the position thereof.

5. Stud welding apparatus according to claim 1 characterized by said chuck means being attached to said plunger member by a chuck adapter, said plunger member being mounted in a bearing block, and a bellows extending between said chuck adapter and said bearing block to encase a portion of the plunger member therebetween.

6. Stud welding apparatus according to claim 5 characterized by said plunger member including a weight platform mounted on the upper end of said plunger member, and a second bellows mounted between said platform and said bearing block to encase the portion of said plunger member between said platform and said bearing block.

7. Stud welding apparatus according to claim 6 characterized by said weight platform having an extension extending to one side thereof beyond said second bellows, said extension being positioned to be engageable by said first support means and said second support means.

8. Stud welding apparatus according to claim 1 characterized by said first means includes a fluid-operated cylinder and said first support means includes a first piston rod means extending from said first cylinder, said second means includes a second fluid-operated cylinder, and said second support means includes second piston rod means extending from said second cylinder.

9. Stud welding apparatus comprising a plunger member mounted for movement among an upper position, an intermediate position, and a lower position; chuck means attached to said plunger member for movement therewith to hold a stud having an end projecting from said chuck means; first means including a first cylinder having a first piston rod means for holding said plunger member in said intermediate position above the workpiece and for enabling said plunger member and said chuck means to fall freely in a straight line to said lower position in order to strike the workpiece with the one end of said stud; second means including a second cylinder having a second piston rod means for moving said plunger member from said lower position in a straight line to said upper position above a workpiece; and means for producing an electrical potential between the stud and the workpiece to cause the stud to be fused to the workpiece when they come in contact.

10. Stud welding apparatus according to claim 9 characterized by means for changing said intermediate position of said plunger member as determined by said second piston rod means.

11. Stud welding apparatus according to claim 10 characterized by said changing means comprises an adjustable stop plate interposed in the path of said first piston rod means and clear of the path of said plunger member.

12. Welding apparatus according to claim 11 characterized by a threaded rod connected to said adjustable stop plate for changing the position of said plate.

13. Stud welding apparatus according to claim 9 characterized by said plunger member including a weight platform affixed to the upper end thereof, and means for attaching weights of various thicknesses to said platform.

14. Stud welding apparatus according to claim 13 characterized by said attaching means comprises a vertically extending rod.

15. Stud welding apparatus according to claim 9 characterized by said chuck means being attached to said plunger member by a part made of insulating material.

16. Stud welding apparatus according to claim 9 characterized by said chuck means being attached to said plunger member by an upper part made of insulating material connected to said plunger member, a lower part connected to said chuck means, and fastening means connecting said lower part and said upper part.

17. Stud welding apparatus according to claim 16 characterized by fastener means connecting said upper part and said plunger member and including at least one central screw and pin means.

18. Stud welding apparatus according to claim 16 characterized by an insulating sheet interposed between said lower part and said upper part.

* * * * *